(12) United States Patent
Tuttle

(10) Patent No.: US 10,824,829 B2
(45) Date of Patent: *Nov. 3, 2020

(54) SYSTEMS AND METHODS TO DETERMINE KINEMATICAL PARAMETERS

(71) Applicant: Micron Technology, Inc., Boise, ID (US)

(72) Inventor: John R. Tuttle, Manvel, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,727

(22) Filed: Jan. 31, 2020

(65) Prior Publication Data

US 2020/0167532 A1    May 28, 2020

Related U.S. Application Data

(63) Continuation of application No. 16/201,704, filed on Nov. 27, 2018, now Pat. No. 10,592,711, which is a continuation of application No. 15/598,199, filed on May 17, 2017, now Pat. No. 10,162,992, which is a continuation of application No. 14/696,247, filed on
(Continued)

(51) Int. Cl.
*G06K 7/10* (2006.01)
*H04Q 9/00* (2006.01)

(52) U.S. Cl.
CPC ..... *G06K 7/10316* (2013.01); *G06K 7/10009* (2013.01); *H04Q 9/00* (2013.01); *H04Q 2209/47* (2013.01)

(58) Field of Classification Search
CPC .......... G06K 7/10009; G06K 7/10316; H04Q 2209/47; H04Q 9/00
See application file for complete search history.

(56) References Cited

U.S. PATENT DOCUMENTS 4,016,568 A    4/1977  Makimoto et al.
4,075,632 A    2/1978  Baldwin et al.
(Continued)

FOREIGN PATENT DOCUMENTS

| KR | 20060112976 | 11/2006 |
| KR | 20070021913 | 2/2007 |
| WO | 2007047226  | 4/2007 |

OTHER PUBLICATIONS

Georgia State University, "Police Radar," located at http://hyperphysics.phy-astr.gsu.edu/hbase/sound/radar.html, Jul. 1, 2003.
(Continued)

*Primary Examiner* — Omeed Alizada
(74) *Attorney, Agent, or Firm* — Greenberg Traurig

(57) ABSTRACT

Systems and methods to determine kinematical parameters of physical objects using radio frequency identification (RFID) tags attached to the objects. In one embodiment, one of a population of RFID tags is selectively instructed by an RFID reader to backscatter the interrogating electromagnetic wave and thus allow the RFID reader to measure the position, speed, acceleration, and/or jerk of the object to which the tag is attached. The RFID reader combines the signal representing the backscattered interrogating electromagnetic wave and the signal representing the interrogating electromagnetic wave transmitted by the RFID reader to determine or monitor one or more of the kinematical parameters of the object.

20 Claims, 6 Drawing Sheets

Related U.S. Application Data

Apr. 24, 2015, now Pat. No. 9,690,961, which is a continuation of application No. 13/891,101, filed on May 9, 2013, now Pat. No. 9,030,301, which is a continuation of application No. 12/134,107, filed on Jun. 5, 2008, now Pat. No. 8,461,966.

(56) References Cited

U.S. PATENT DOCUMENTS

| | | |
|---|---|---|
| 4,804,961 A | 2/1989 | Hane |
| 5,796,362 A | 8/1998 | Ayasli et al. |
| 5,900,834 A | 5/1999 | Kubinec |
| 5,952,922 A | 9/1999 | Shober |
| 6,046,683 A | 4/2000 | Pidwerbetsky et al. |
| 6,084,530 A | 7/2000 | Pidwerbetsky et al. |
| 6,424,916 B2 | 7/2002 | Nysen |
| 6,456,191 B1 | 9/2002 | Federman |
| 6,600,418 B2 | 7/2003 | Francis et al. |
| 6,674,403 B2 | 1/2004 | Gray et al. |
| 6,717,516 B2 | 4/2004 | Bridgelall |
| 6,920,330 B2 | 7/2005 | Caronni et al. |
| 7,045,996 B2 | 5/2006 | Lyon et al. |
| 7,049,965 B2 | 5/2006 | Kelliher et al. |
| 7,091,863 B2 | 8/2006 | Ravet |
| 7,119,687 B2 | 10/2006 | Paulsen et al. |
| 7,142,120 B2 | 11/2006 | Charych et al. |
| 7,147,246 B2 | 12/2006 | Breed et al. |
| 7,156,312 B2 | 1/2007 | Becker et al. |
| 7,170,412 B2 | 1/2007 | Knox et al. |
| 7,215,976 B2 | 5/2007 | Brideglall |
| 7,308,202 B2 | 12/2007 | Roes et al. |
| 7,310,045 B2 | 12/2007 | Inui |
| 7,378,967 B2 | 5/2008 | Sullivan et al. |
| 7,388,501 B2 | 6/2008 | Tang et al. |
| 7,403,120 B2 | 7/2008 | Duron et al. |
| 7,453,363 B2 | 11/2008 | Reynolds |
| 7,504,952 B2 | 3/2009 | Kaplan et al. |
| 7,511,604 B2 | 3/2009 | Raphaeli et al. |
| 7,561,048 B2 | 7/2009 | Yushkov et al. |
| 7,580,378 B2 | 8/2009 | Carrender et al. |
| 7,609,163 B2 | 10/2009 | Shafer |
| 7,689,195 B2 | 3/2010 | Wu et al. |
| 7,907,056 B2 | 3/2011 | Shimizu |
| 7,924,160 B1 | 4/2011 | LaPenta et al. |
| 8,242,888 B2 | 8/2012 | Tuttle |
| 8,294,554 B2 | 10/2012 | Shoarinejad et al. |
| 8,461,966 B2 | 6/2013 | Tuttle |
| 8,633,805 B2 | 1/2014 | Tuttle |
| 8,830,062 B2 | 9/2014 | Tuttle |
| 9,030,301 B2 | 5/2015 | Tuttle |
| 9,477,863 B2 | 10/2016 | Tuttle |
| 9,690,961 B2 | 6/2017 | Tuttle |
| 10,162,992 B2 | 12/2018 | Tuttle |
| 10,438,031 B2 | 10/2019 | Tuttle |
| 2002/0019702 A1 | 2/2002 | Nysen |
| 2002/0149480 A1 | 10/2002 | Shanks et al. |
| 2003/0147651 A1 | 8/2003 | Roes et al. |
| 2004/0178944 A1 | 9/2004 | Richardson et al. |
| 2004/0217865 A1 | 11/2004 | Turner |
| 2005/0012653 A1 | 1/2005 | Heide et al. |
| 2005/0040994 A1 | 2/2005 | Mazoki et al. |
| 2005/0052287 A1 | 3/2005 | Whitesmith et al. |
| 2005/0226518 A1 | 10/2005 | Suzuki et al. |
| 2005/0237159 A1 | 10/2005 | Cooper et al. |
| 2005/0237953 A1 | 10/2005 | Carrender et al. |
| 2005/0253725 A1 | 11/2005 | Neuwirth et al. |
| 2005/0258937 A1 | 11/2005 | Neuwirth |
| 2005/0280539 A1 | 12/2005 | Pettus |
| 2006/0001525 A1 | 1/2006 | Nitzan et al. |
| 2006/0038676 A1 | 2/2006 | Richards |
| 2006/0043199 A1 | 3/2006 | Baba et al. |
| 2006/0220794 A1 | 10/2006 | Zhu |
| 2006/0238301 A1 | 10/2006 | Wu et al. |
| 2006/0244580 A1 | 11/2006 | Nordmeyer |
| 2006/0273905 A1 | 12/2006 | Choi et al. |
| 2007/0001814 A1 | 1/2007 | Steinke et al. |
| 2007/0030151 A1 | 2/2007 | Morrow |
| 2007/0037582 A1 | 2/2007 | Mohi et al. |
| 2007/0109099 A1 | 5/2007 | Raphaeli et al. |
| 2007/0139200 A1 | 6/2007 | Yushkov et al. |
| 2007/0149216 A1 | 6/2007 | Misikangas |
| 2007/0152831 A1 | 7/2007 | Eisele |
| 2007/0152833 A1 | 7/2007 | Kaplan et al. |
| 2007/0182578 A1 | 8/2007 | Smith |
| 2007/0247311 A1 | 10/2007 | Muchkaev |
| 2007/0268140 A1 | 11/2007 | Tang et al. |
| 2007/0279192 A1 | 12/2007 | Tanaka |
| 2008/0012712 A1 | 1/2008 | Shimizu |
| 2008/0021651 A1 | 1/2008 | Seeley et al. |
| 2008/0061976 A1 | 3/2008 | Shafer |
| 2008/0136644 A1 | 6/2008 | Mccorkle |
| 2008/0180218 A1 | 7/2008 | Flax |
| 2008/0197982 A1 | 8/2008 | Sadr |
| 2008/0231424 A1 | 9/2008 | Arnitz |
| 2008/0238685 A1 | 10/2008 | Tuttle |
| 2008/0238686 A1 | 10/2008 | Tuttle |
| 2008/0252293 A1 | 10/2008 | Lagae et al. |
| 2008/0252422 A1 | 10/2008 | Dowla et al. |
| 2008/0280560 A1 | 11/2008 | Tuttle |
| 2008/0318682 A1 | 12/2008 | Rofougaran et al. |
| 2008/0318683 A1 | 12/2008 | Rofougaran et al. |
| 2009/0091428 A1 | 4/2009 | Tuttle |
| 2009/0091454 A1 | 4/2009 | Tuttle |
| 2009/0303004 A1 | 12/2009 | Tuttle |
| 2009/0303005 A1 | 12/2009 | Tuttle |
| 2009/0303007 A1 | 12/2009 | Ryou et al. |
| 2010/0123558 A1 | 5/2010 | Park et al. |
| 2010/0253481 A1 | 10/2010 | Zand |
| 2012/0268253 A1 | 10/2012 | Tuttle |
| 2012/0268308 A1 | 10/2012 | Tuttle |
| 2013/0241708 A1 | 9/2013 | Tuttle |
| 2014/0104042 A1 | 4/2014 | Tuttle |
| 2015/0227770 A1 | 8/2015 | Tuttle |
| 2016/0363662 A1 | 12/2016 | Tuttle |
| 2017/0032157 A1 | 2/2017 | Tuttle |
| 2017/0262669 A1 | 9/2017 | Tuttle |
| 2019/0095661 A1 | 3/2019 | Tuttle |
| 2019/0257937 A1 | 8/2019 | Tuttle |
| 2019/0266366 A1 | 8/2019 | Tuttle |

OTHER PUBLICATIONS

International Application No. PCT/US08/54901, International Search Report and Written Opinion, dated Jul. 28, 2008.
International Application No. PCT/US08/55537, International Search Report and Written Opinion, dated Jul. 30, 2008.
International Application No. PCT/US08/56247, International Search Report and Written Opinion, dated Aug. 14, 2008.
Page, Raymond, "A Low Power RFID Transponder," RF Design, pp. 31-32, 34, 36, Jul. 1993.
Trolley Scan (Pty) Ltd., RFID-radar Newsletters No. 1-No. 12, Oct. 2005-Jan. 2007.
Title: Systems and Methods to Determine Motion Parameters Using RFID Tags, U.S. Appl. No. 12/134,103, filed Jun. 5, 2008, Inventor: John Tuttle, Status: Patented Case Status Date: Jul. 25, 2012.
Title: Systems and Methods to Determine Motion Parameters Using RFID Tags, U.S. Appl. No. 13/533,890, filed Jun. 26, 2012, Inventor: John Tuttle, Status: Patented Case Status Date: Dec. 31, 2013.
Title: Systems and Methods to Determine Motion Parameters Using RFID Tags, U.S. Appl. No. 14/132,482, filed Dec. 18, 2013, Inventor: John Tuttle, Status: Patented Case Status Date: Oct. 5, 2016.
Title: Systems and Methods to Determine Motion Parameters Using RFID Tags, U.S. Appl. No. 15/295,103, filed Oct. 17, 2016, Inventor: John Tuttle, Status: Patented Case Status Date: Sep. 18, 2018.
Title: Systems and Methods to Determine Motion Paramenters using RFID Tags, U.S. Appl. No. 16/405,946, filed May 7, 2019, Inventor: John Tuttle, Status: Allowed—Notice of Allowance Not Yet Mailed Status Date: Jan. 9, 2020.
Title: Systems and Methods to Use Radar in RFID Systems, U.S. Appl. No. 12/134,106, filed Jun. 5, 2008, Inventor: John Tuttle, Status: Patented Case Status Date: Aug. 20, 2014.

(56) References Cited

OTHER PUBLICATIONS

Title: Systems and Methods to Use in Radar in RFID Systems, U.S. Appl. No. 14/454,546, filed Aug. 7, 2014, Inventor: John Tuttle, Status: Publications—Issue Fee Payment Verified Status Date: Jan. 17, 2020.
Title: Systems and Methods to Use Radar in RFID Systems, U.S. Appl. No. 16/398,096, filed Apr. 29, 2019, Inventor: John Tuttle, Status: Docketed New Case—Ready for Examination Status Date: May 13, 2019.
Title: Systems and Methods to Determine Kinematical Parameters using RFID Tags, U.S. Appl. No. 12/134,107, filed Jun. 5, 2008, Inventor: John Tuttle, Status: Patented Case Status Date: May 22, 2013.
Title: Systems and Methods to Determine Kinematical Parameters Using RFID Tags, U.S. Appl. No. 13/891,101, filed May 9, 2013, Inventor: John Tuttle, Status: Patented Case Status Date: Apr. 22, 2015.
Title: Systems and Methods to Determine Kinematical Parameters Using RFID Tags, U.S. Appl. No. 14/696,227, filed Apr. 24, 2015, Inventor: John Tuttle, Status: Patented Case Status Date: Jun. 7, 2017.
Title: Systems and Methods to Determine Kinematical Parameters using RFID Tags, U.S. Appl. No. 15/598,199, filed May 17, 2017, Inventor: John Tuttle, Status: Patented Case Status Date: Dec. 5, 2018.
Title: Systems and Methods to Determine Kinematical Parameters, U.S. Appl. No. 16/201,704, filed Nov. 27, 2018, Inventor: John Tuttle, Status: Publications—Issue Fee Payment Received Status Date: Feb. 4, 2020.

SYSTEMS AND METHODS TO DETERMINE KINEMATICAL PARAMETERS

RELATED APPLICATIONS

The present application is a continuation application of U.S. patent application Ser. No. 16/201,704, filed Nov. 27, 2018 which is a continuation application of U.S. patent application Ser. No. 15/598,199, filed May 17, 2017 and issued as U.S. Pat. No. 10,162,992 on Dec. 25, 2018, which is a continuation application of U.S. patent application Ser. No. 14/696,247, filed Apr. 24, 2015 and issued as U.S. Pat. No. 9,690,961 on Jun. 27, 2017, which is a continuation application of U.S. patent application Ser. No. 13/891,101, filed May 9, 2013 and issued as U.S. Pat. No. 9,030,301 on May 12, 2015, which is a continuation application of U.S. patent application Ser. No. 12/134,107, filed Jun. 5, 2008, issued as U.S. Pat. No. 8,461,966 on Jun. 11, 2013, and entitled "Systems and Methods to Determine Kinematical Parameters using RFID Tags", the entire disclosures of which applications are hereby incorporated herein by reference.

FIELD OF THE TECHNOLOGY

At least some embodiments disclosed herein relate to determining kinematical parameters of physical objects, such as position, speed, or acceleration, using a radio frequency identification (RFID) tag.

BACKGROUND

A typical radio frequency identification (RFID) tag has a memory configured to store data, such as data that uniquely identifies the tag among a plurality of RFID tags. An RFID reader can be used to communicate with RFID tags over a radio link. Thus, the identity of the tag and the object labeled by the tag can be determined by the RFID reader in an automated process.

In a typical RFID system, an RFID reader is configured to interrogate the tags via radio frequency electromagnetic waves. The RFID reader broadcasts commands using a beam of electromagnetic wave. In response to the interrogation signals from the RFID reader, an RFID tag can be selected to produce a radio frequency response signal.

An RFID tag may be passive, semi-passive or active, depending on the power source of the RFID tag and how the response from the RFID is generated.

A passive RFID tag does not have an internal battery or power source. A passive RFID tag operates using the power drawn from the interrogating electromagnetic wave. A passive RFID tag provides responses through modulating the interrogating electromagnetic wave backscattered by the tag.

A semi-active RFID tag operates using the power drawn from its internal battery or power source. A semi-active RFID tag provides responses through modulating the interrogating electromagnetic wave backscattered by the tag.

An active tag that has an internal battery or power source, using which a separate transmission signal is generated to provide the response. The response carrier signal is generated independent from the interrogating electromagnetic wave.

Radio frequency identification (RFID) tags are used in a variety of applications, such as tagging vehicles on toll roads, tagging shipping containers, quality control on assembly line conveyor belts, and monitoring tactical military equipment maneuvers, etc.

SUMMARY OF THE DESCRIPTION

Systems and methods to determine kinematical parameters of physical objects using radio frequency identification (RFID) tags attached to the objects are described herein. Some embodiments are summarized in this section.

In one embodiment, one of a population of RFID tags is selectively instructed by an RFID reader to backscatter the interrogating electromagnetic wave and thus allow the RFID reader to measure the position, speed, acceleration, and/or jerk of the object to which the tag is attached. The RFID reader combines the signal representing the backscattered interrogating electromagnetic wave and the signal representing the interrogating electromagnetic wave transmitted by the RFID reader to determine or monitor one or more of the kinematical parameters of the object.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least one embodiment of the disclosure provides a process implemented in a radio frequency identification system to monitor the physical objects tagged by RFID tags. In one embodiment, an antenna feed signal is generated and used by an RFID reader to send an interrogating electromagnetic wave to radio frequency devices, such as an RFID tag. A backscattered electromagnetic wave is received from the RFID tag to create a received signal. A combined signal is generated or calculated based on the antenna feed signal and the received signal. The position of the object, or the distance between the radio frequency device and the reading antenna, is then determined based on the combined signal. In one embodiment, the position of the object, or the distance between the radio frequency device and the reading antenna, as a function of time is tracked to obtain the speed, acceleration, jerk, etc. of the object.

Figure 1:
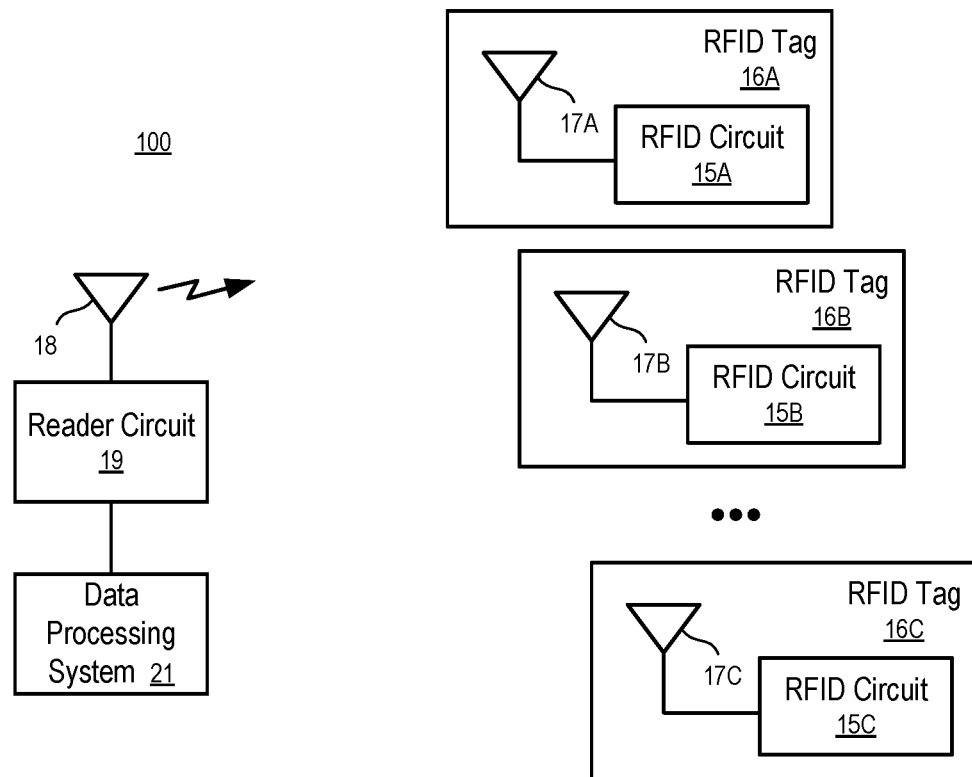
FIG. 1 shows a radio frequency identification (RFID) system according to one embodiment.

FIG. 1 shows a radio frequency identification (RFID) system according to one embodiment. In FIG. 1, the system (100) includes a data processing system (21) coupled to an RFID reader circuit (19). The data processing system (21) may include a general purpose computer, or a special purpose computer, or a set of computers coupled to the reader circuit (19) via a data communication network, such as a local area network, Internet, etc. The reader circuit (19), or a combination of the reader circuit (19) and the data processing system (21), may also be referred to as an interrogator or reader.

In FIG. 1, the reader circuit (19) communicates with one or more RFID tags (e.g., 16A, 16B, . . . , 16C) that are within the radio communication range of the RFID system via the reader antenna (18). The reader circuit (19) provides a carrier signal to power the antenna (18) which sends a beam of interrogating electromagnetic wave to the RFID tags (e.g., 16A, 16B, . . . , 16C). Commands to the RFID tags (e.g., 16A, 16B, . . . , 16C) are modulated on the carrier signal.

The RFID tags (e.g., 16A, 16B, . . . , 16C) include their individual tag antennas (e.g., 17A, 17B, . . . , 17C) to receive the interrogating electromagnetic wave, and corresponding RFID circuits (e.g., 15A, 15B, . . . , 15C) to process the commands received from the RFID reader. Based on the commands, the RFID tags (e.g., 16A, 16B, . . . , 16C) can be selectively silenced (e.g., being placed in a mode to reduce interrogating electromagnetic wave backscattered from the tag, or not to actively transmit any signals using its internal power source), or be instructed to produce a response.

In one embodiment, the RFID system (100) is used not only to identify the RFID tags, but also to determine the kinematical parameters of the RFID tags relative to the reader circuit (19) and thus the corresponding kinematical parameters of physical objects (not shown in FIG. 1) that are tagged by the corresponding RFID tags. For example, the reader can be used to determine a distance between an RFID tag (e.g., 16A, or 16B, or 16C) and the reader antenna (18), a relative speed, acceleration or jerk between the tag and the reader.

In one embodiment, one of the RFID tags is instructed to be responsive to the RFID reader circuit (19) while other RFID tags are silenced (or being out of range). For example, one of the RFID tags can be instructed to be in a reflection mode to reflect the interrogating electromagnetic wave transmitted from the reader antenna (18), while other RFID tags are instructed to be in an absorbing mode to absorb the interrogating electromagnetic wave. Thus, the selected RFID tag works as an RF reflector to temporarily identify the motion of the object to which the selected RFID tag is attached, while other RFID tags work as RF absorbers to reduce noise and make other objects temporarily invisible to the reader.

In one embodiment, the interrogation signal from the reader circuit (19) is received by the tag antenna (17A) and passed to the RFID circuit (15A) for processing. If the interrogation signal triggers a response, the RFID circuit (15A) uses its tag antenna (17A) to send to the reader circuit (19) a response, such as tag identification information or other data stored in the memory of the tag (16A).

The reader circuit (19) passes the data obtained from the RFID tags to the data processing system (21), which performs any suitable function. For example, based on the data received from the RFID tags (e.g., 16A, 16B, . . . , 16C), the data processing system (21) may allow access to a building or parking garage, note the entrance of an employee to a work location, direct a parcel identified by the RFID tag down a particular conveyor system, or conduct inventory of products in a shopping cart for purposes of checkout and payment.

In one embodiment, the reader circuit (19) and/or the data processing system (21) also determine various parameters that characterize the motion of the RFID tags, such as the position, velocity, acceleration, jerk, etc., using the response signal from the RFID tag.

When there is no relative motion between the RFID tag and the reader circuit, the phase difference between the interrogating electromagnetic wave transmitted by the reader and the backscattered interrogating electromagnetic wave transmitted by the reader is a function of the distance the backscattered interrogating electromagnetic wave traveled (which corresponds to the distance between the RFID tag and the reader). This static effect is sometimes called fading, wavelength interference or a Rician effect.

When the RFID tag moves relative to the reader, the phase difference changes as a function of the distance and thus also as a function of time. The change in the phase difference as a function of time leads to a frequency difference between the interrogating electromagnetic wave transmitted by the reader and the backscattered interrogating electromagnetic wave transmitted by the reader. When there is a movement relative to each other between an RFID tag and the reader circuit, the response signal from the RFID tag has a frequency shift that is proportional to the relative speed of motion due to Doppler Effect.

In one embodiment, the phase difference is used to determine the distance between the RFID tag and the reader; and the frequency shift is used to determine the relative motion speed between the RFID tag and the reader. The speed can also be calculated based on the distance measurements (e.g., through a time derivative of distance); and the distance can also be calculated based on the speed measurements (e.g., through a time integral of speed).

For example, in one embodiment, the frequency shift in the response signal is determined to compute the speed of motion. Acceleration can then be determined based on a time derivative of the speed; and jerk can be determined based on a time derivative of the acceleration. The distance of the tag from the reader antenna can be estimated based a known position of the tag at a particular time instance and a time integration of the speed of the tag as monitored by the reader.

For example, in another embodiment, the phase shift in the response signal is determined to measure the distance between the RFID tag and the reader; and speed, acceleration and jerk are calculated from time derivatives of the distance. The phase shift may provide a distance measurement with certain ambiguity (since the phase shift typically has the ambiguity of 2n, where n=0, 1, 2, . . . ). In one embodiment, ambiguity is resolved via measuring using multiple antennas and/or via the signal strength of the backscattered interrogating electromagnetic waves. Alternatively or in combination, the ambiguity can also be resolved via tracking the movement of the RFID tag and/or via mechanical, optical or other types of sensors or triggers to determine an initial position of the RFID tag.

In one embodiment, the phase difference and the frequency shift are both measured and used to obtain the kinematical parameters.

In one embodiment, the RFID tag is instructed to provide a response via modulating the amplitude of the backscattered interrogating electromagnetic wave, or remaining at a high backscattering state (e.g., in a backscattering mode), while other RFID tags are silenced (e.g., remaining at a low backscattering state) or out of the interrogation range. When an RFID tag is silenced, either by making its antenna absorptive or by not allowing any change in absorptive or reflective backscatter states, the interrogating electromagnetic wave backscattered from the silenced RFID tag is negligible or constant; and thus the silenced RFID tag is not considered in a backscattering mode. The RFID reader combines the received signal that represents the electromagnetic wave backscattered from the selected RFID tag and the signal representing the interrogating electromagnetic wave that is being transmitted by the reader to determine a frequency shift and thus the speed of relative line-of-sight motion between the tag antenna and the reader antenna.

In one embodiment, the RFID tag is instructed to change between the absorptive state and the reflective state to modulate the interrogating electromagnetic wave to aid the detection of null points and/or to aid the measurement of distance to null points. The reader measures the amplitude of the reflected binary signal and determines that a null has occurred when the amplitude of the reflected binary signal goes to zero. For example, the reader can send a command to the RFID tag to instruct the RFID tag to start sending binary signals by toggling between the absorptive state and the reflective state. The RFID tag can change between the absorptive state and the reflective state at a constant frequency (e.g., to represent a sequence of "010101 . . . "), or change between the absorptive state and the reflective state according to predetermined data, or random data.

In one embodiment, the reader sends one command to place the RFID tag in the absorptive state to generate a combination of the received wave and the transmitted wave; and then the reader sends another command to place the RFID tag in the reflective state to generate a combination of the received wave and the transmitted wave. When the RFID tag is switched to the absorptive state, the amplitude of the combination of the received wave and the transmitted wave is indicative of a signal level corresponding to null. When the RFID tag is switched to the reflective state, the amplitude of the combination of the received wave and the transmitted wave relative to the null level represents the phase difference between the backscattered wave and the transmitted wave. The magnitude difference in the combinations represents the amplitude of the reflected binary signal. The reader determines that a null has occurred when the amplitude of the reflected binary signal goes to zero.

Further, since the magnitude of the difference is indicative of a distance between the position of the RFID and a nearby null point, the magnitude of the difference can be used to compute the distance.

In some embodiments, the RFID tag is instructed to respond by backscattering a number or identification code, or backscattering certain data stored on the RFID tag, or random numbers. The reader combines the backscattered wave with the transmitted wave to determine the magnitude of the binary data to determine the position of the RFID tag. In one embodiment, the RFID tag can further modulate data on the interrogating electromagnetic wave via phase modulation, or other methods, such as Frequency-Shift Keying (FSK) or spread spectrum methods.

Thus, measuring the amplitude of the binary signal modulated via toggling between the absorptive state and reflective state can improve the detection of null points and/or distances to the null points. In measuring and/or determining the position of a static object having the RFID tag attached, the RFID tag can provide a reference level by selectively switching to an absorptive state.

Since the RFID tags can be selectively placed in the backscattering mode, the reader can obtain the backscattered interrogating electromagnetic wave from the selected RFID tag without having to aim the beam of the electromagnetic wave at the RFID tag to avoid other RFID tag. In one embodiment, an RFID tag is selected to reflect or backscatter the interrogating electromagnetic wave, while other non-selected RFID tags are placed in an absorbing mode to reduce noise.

Figure 2:
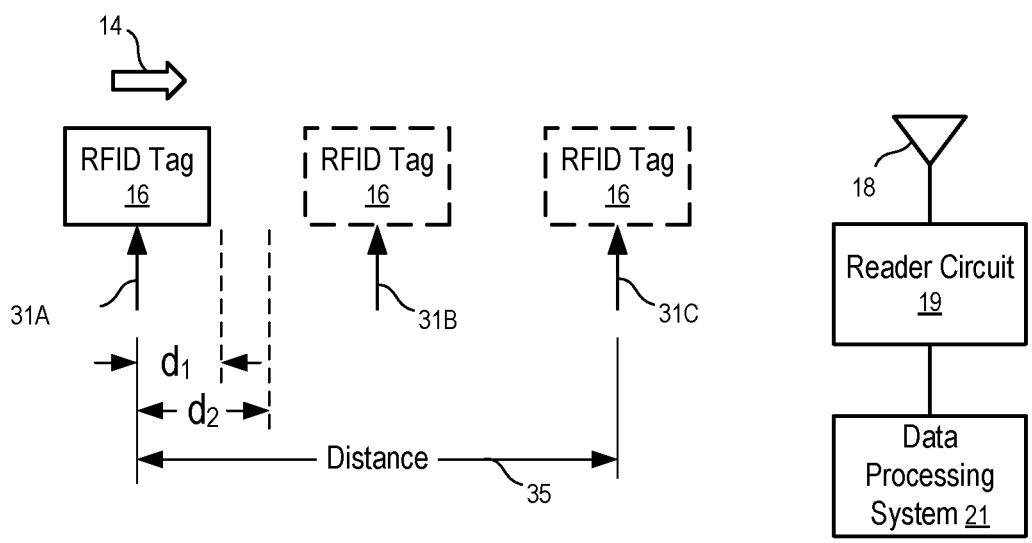
FIG. 2 shows an RFID system configured to determine motion parameters using an RFID tag according to one embodiment.

FIG. 2 shows an RFID system configured to determine motion parameters using an RFID tag according to one embodiment. In FIG. 2, the reader circuit (19) is configured to provide a carrier signal to power the antenna (18) to transmit an interrogation signal to the RFID tag (16). A reader circuit (19) is also configured to receive the response signals from a tag. The reader circuit (19) combines the transmitted carrier signal and the response signals to determine a phase or frequency offset to determine the distance or the motion speed (14) between the tag (16) and the reader circuit (19).

The transmitted carrier signal and the response signal can be combined in a number of ways to determine the frequency difference between the transmitted carrier signal and the response signal. For example, the transmitted carrier signal and the response signal can be summed in analog form to create a combined signal that is indicative of the phase or frequency difference. Alternately, the transmitted carrier signal and the response signal can be mixed (multiplied) in analog form to create the combined signal. In one embodiment, the magnitude of the profile of the combined signal is used to determine the phase difference.

In one embodiment, the transmitted carrier signal and the response signal are normalized before they are combined to avoid combining signals that have peak amplitude substantially different from each other. In one embodiment, the signals are normalized before they are combined to allow the determination of the phase or distance based on the magnitude of the profile of the combined signal.

In one embodiment, the frequency-shifted carrier signal in the response backscattered from the RFID is recovered via modulation removal (e.g., to remove the data encoded on the carrier signal via amplitude modulation) and combined with the carrier signal of the reader to determine the frequency shift.

Alternatively, transmitted carrier signal and the response signal can be digitized into a binary waveform and combined via exclusive OR (XOR) operation to generate a signal that is indicative of the frequency or phase difference between the transmitted carrier signal and the response signal. For example, counting the transition in combined signals over a period of time can be used to determine the frequency/phase difference between the transmitted carrier signal and the response signal. For example, the difference between the transmitted carrier signal and the response signal can be used for determining a third (beat) frequency.

When the RFID tag (16) moves in a constant speed towards the reader antenna (18), phase alignment between the backscattered signal and the carrier signal of the reader changes as the distance between the RFID tag (16) and the reader antenna (18) changes. The phase shift is proportional to time as the RFID tag (16) moves at a constant speed towards the reader antenna (18), causing a constant frequency shift between the backscattered signal and the carrier signal of the reader.

For example, when the RFID tag (16) is at the position (31A), the phase of the backscattered signal as received by the reader antenna may be substantially opposite to the phase of the carrier signal that is being transmitted by the reader. Thus, the profile of a signal combined from the backscattered signal and the transmitted signal reaches an extreme (e.g., minimum). When the RFID tag (16) is moved to the position (31B), the phase of the backscattered signal as received by the reader antenna may be substantially aligned with the phase of the carrier signal that is being transmitted by the reader. Thus, the profile of the signal combined from the backscattered signal and the transmitted signal reaches another extreme (e.g., maximum). When the RFID tag (16) moved to the position (31C), the phase of the backscattered signal as received by the reader antenna may again be opposite to the phase of the carrier signal that is being transmitted by the reader. Thus, the profile of the signal combined from the backscattered signal and the transmitted signal returns to the previous extreme (e.g., minimum). The periodic changes in the profile magnitude in the combined signal indicate the phase shift due to the relative motion between the tag and the reader. When the relative speed between the RFID tag and reader is a constant, the phase shift over the period of time is related to the frequency shift.

Figure 3:
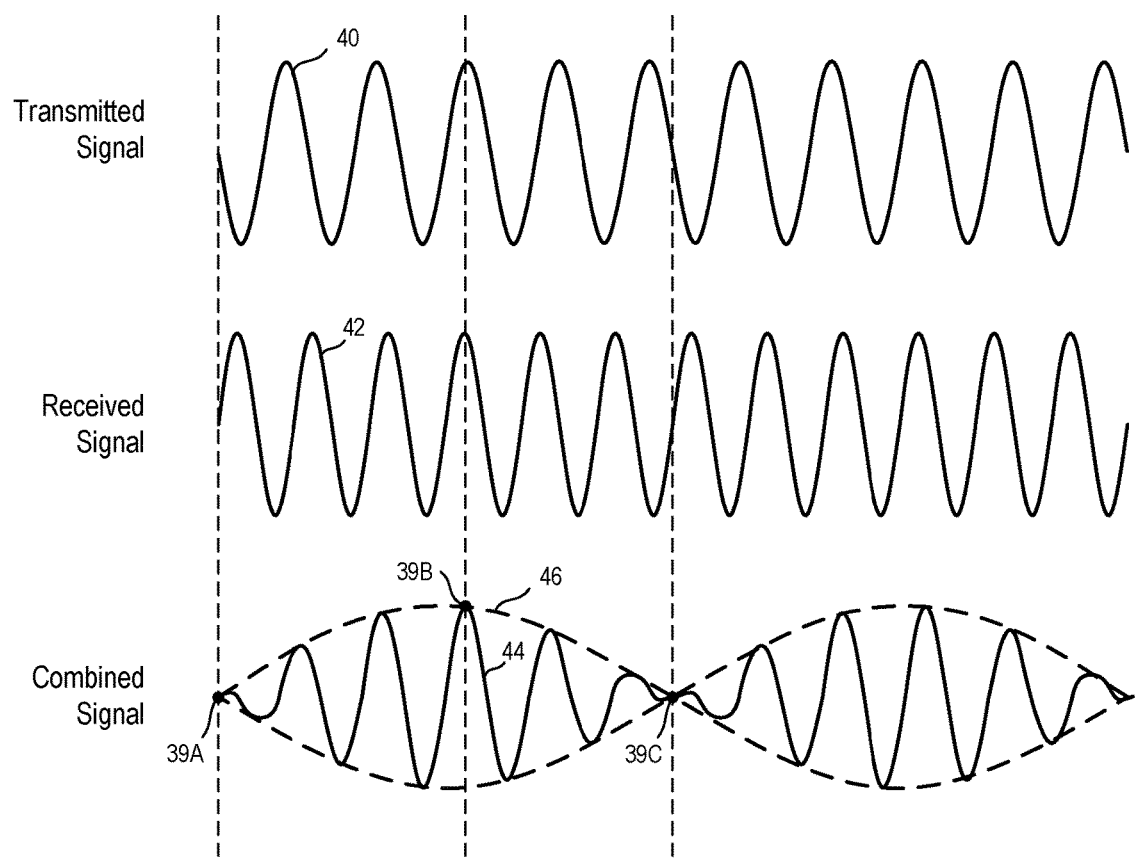
FIG. 3 shows waveforms of a plurality of signals in an RFID system according to one embodiment.

FIG. 3 shows waveforms of a plurality of signals in an RFID system according to one embodiment. In FIG. 3, the signal (40) represents the signal that is being transmitted by the reader. The signal (42) represents the signal that is being backscattered from the moving RFID tag and received at the reader. Signal (42) is at a different higher frequency than is signal (40) because the tag is moving toward the reader.

At time instance (39A), which corresponds to the tag being at the position (31A) shown in FIG. 2, the transmitted signal (40) and the received signal (42) have opposite phase. Thus, the profile (46) of the combined signal (44) reaches a minimum. Note that when the tag is moving relative to the reader antenna, the wavelength $\lambda_{moving}$ of the electromagnetic wave as observed by the tag and the reader antenna changes as a function of the relative speed between the tag and the reader antenna. Thus, using the wavelength astatic of the electromagnetic wave as observed by a tag that is motionless relative to the reader antenna in computing the null position can introduce an error that is a function of $\lambda_{moving}/\lambda_{static}$. In one embodiment, the system determines the relative motion speed between the tag and the reader antenna to estimate the wavelength $\lambda_{moving}$ and then corrects the computed position of the null point using the factor $\lambda_{moving}/\lambda_{static}$. The velocity can be computed based on Doppler frequency shift or based on distance estimated based on Rician effect. This error is negligible when the speed of tag is low in comparison with the speed of light. However, when the motion speed between the tag and the reader antenna is high enough to introduce significant wavelength change, the correction based on the factor $\lambda_{moving}/\lambda_{static}$ can be applied.

At time instance (39B), which corresponds to the tag being at the position (31B) shown in FIG. 2, the transmitted signal (40) and the received signal (42) both have their maxima at the same time. Thus, the profile envelope (46) of the combined signal (44) reaches a maximum.

At time instance (39C), which corresponds to the tag being at the position (31C) shown in FIG. 2, the transmitted signal (40) and the received signal (42) both have their zeros at the same time. Thus, the profile (46) of the combined signal (44) again reaches a minimum. In this example, envelope (46) represents a beat frequency.

In one embodiment, the relative speed (14) between the tag (16) and the reader is proportional to the product of the wave length of the interrogating electromagnetic wave and the frequency of the profile envelope of the combined signal (44). The change (35) in distance between the RFID tag and the reader is proportional to the product of the wave length of the interrogating electromagnetic wave and the number of cycles in the profile of the combined signal (44).

A cycle in the profile of the combined signal (44) (e.g., between 39A and 39C) corresponds to the distance (35) as shown in FIG. 2. The frequency of the profile of the combined signal (44) corresponds to the frequency shift (e.g., due to Doppler effect).

In one embodiment, the combined signal (44) is filtered (e.g., using a low pass filter) to generate the profile signal. The characteristic points in the profile of the combined signal (44) are counted to determine the frequency of the profile of the combined signal (44) or to resolve the ambiguity in phase differences in determining the position of the RFID tag. A representation of the absolute value of the profile of the combined signal (44) is illustrated in FIG. 4.

Figure 4:
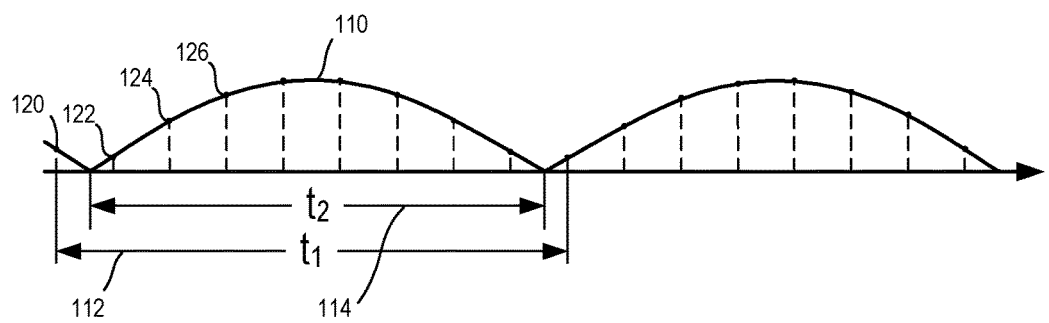
FIG. 4 shows a method to determine a time period according to one embodiment.

FIG. 4 shows a method to determine a time period according to one embodiment. The time period can be used to determine the average speed of the RFID tag between two positions that are corresponding to the characteristic points on the profile signal. In FIG. 4, the magnitude of the profile (110) is sampled periodically to determine the number of cycles in the profile observed in a period of time, or the frequency of the profile (which is the number of cycles in the profile observed divided by the period of time).

The sampled profile points (e.g., 120, 122, 124, 126, . . . ) are used to determine the occurrence of the characteristic points, such as the null, minimum, maximum, inflection points, etc.

In FIG. 4, the time period $t_2$ (114) represents a cycle of the profile. The time period $t_2$ (114) can be determined from the sampled profile points during time period $t_1$ (112). For example, after the sampled profiled points (e.g., 120, 122, 124, . . . ) are obtained, it can be determined that a minimum point representing the starting point of the time period $t_2$ (114) occurred between the sample points (120 and 122). Further, an estimated time of the starting point of the time period $t_2$ (114) can be determined through interpolation or curve fitting for improved accuracy. Similarly, an estimated time of the ending point of the time period $t_2$ (114) can also be determined. Thus, an accurate estimate of the time period $t_2$ (114) can be obtained from the sampled profile points. The time period $t_2$ (114) is obtained after eliminating from the time period $t_1$ (112) the time before the first characteristic point and the time after the last characteristic point. Since the change in distance (e.g., 35 illustrated in FIG. 2) within the cycle is a known function of the wavelength $\lambda$ of the interrogating electromagnetic wave (e.g., $\lambda/2$), the average motion speed between the RFID tag and reader can be calculated from dividing the distance (e.g., 35 illustrated in FIG. 2) by the calculated time period $t_2$ (114).

Alternatively, the time period $t_2$ (114) can be approximated using the time period $t_1$ (112) that includes one sample point immediately before the starting point of the time period $t_2$ (114) and one sample point immediately after the ending point of the time period $t_2$ (114). Alternatively, the time period $t_2$ (114) can be approximated using the time period between the sample point occurred immediately before the starting point of the time period $t_2$ (114) and the sample point occurred immediately occurred before the ending point of the time period $t_2$ (114) (or the time period between the sample point occurred immediately after the starting point of the time period $t_2$ (114) and the sample point occurred immediately after the ending point of the time period $t_2$ (114). When the accuracy of the estimated time period increases as the frequency of the sample points increases.

In one embodiment, the reader can count the number of different characteristic points to compute frequency offset. For example, to reduce the time for the determination of the relative speed of motion between the tag and the reader, a half cycle between a minimum and a maximum can be identified as the beginning and ending points of the time period of the calculation. The relative speed can also be estimated using other numbers of cycles (e.g., two or more cycles, one and half cycles, etc.)

In one embodiment, the change in distance between the tag and the reader can be determined based on an average speed of motion between the tag and the reader. In another embodiment, the change in distance can be determined based on the number cycles, which may include a portion of a cycle, as observed in the corresponding time instances in the profile signal. Through interpolation or curve fitting, the counted number of cycles can be accurate to a fraction of a cycle.

Alternatively, the average speed at nearest half cycle (or one cycle in the profile) can be used to compute the distance traveled in the fraction of a cycle. For example, the speed determined using the first half of the cycle (e.g., from the minimum to the maximum in the profile during the time period $t_2$) can be used to determine the distance travel in the time period between the beginning of the time period $t_1$ (114) and the beginning of the time period $t_2$ (114).

FIGS. 3 and 4 illustrate an example of a RFID tag moving with a constant speed relative to the reader. However, when the speed of the RFID tag changes during the distance (e.g., 35 illustrated in FIG. 2), the phase change may not be directly proportional to time; the frequency shift between the transmitted signal and the received signal may not be a constant; and the shape of the profile signal may change. However, counting the number of characteristic points can still provide the average motion speed within a cycle of the profile signal and provide a reference to resolve ambiguity in distance measurements.

For example, when the profile is at a null point (e.g., 39A), the distance between the reader and the RFID tag can be determined to be at a set of candidate points (e.g., 31A, 31C in FIG. 2). The RFID tag may be at position (31A) or at position (31C), since both positions produce a null point on a profile signal. Once an initial position is determined (e.g., via a trigger or sensor), the ambiguity can be resolved via counting the number of null points on the profile signal.

Figure 5:
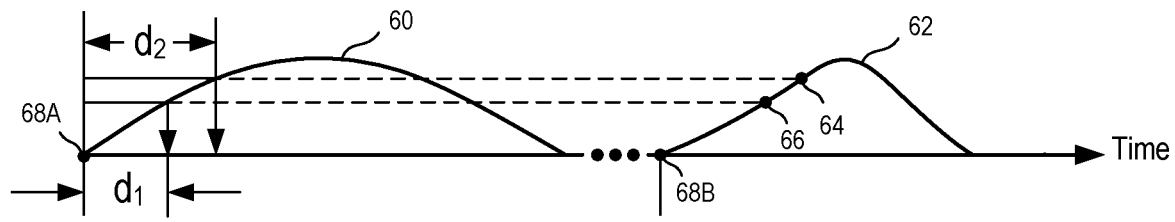
FIG. 5 shows a method to measure distance according to one embodiment.

Even when the RFID tag is not moving at a constant speed, the position of the RFID tag can be determined with improved precision based on the profile signal, as illustrated in FIG. 5.

FIG. 5 shows a method to measure distance according to one embodiment. In FIG. 5, the magnitude of the profile signal at a given instant of time is used to determine the distance. In FIG. 5, the profile (60) corresponds to the RFID tag moving at a constant speed relative to the reader; and the profile (62) corresponds to the RFID tag moving at a changing speed relative to the reader. When the RFID tag is moving at a varying speed, the shape of the profile (62) is distorted. However, the magnitude of the profile (62) at a given instance of time (e.g., at point 66 or 64) indicates the phase difference between the received backscattered wave and the transmitted wave; and the phase difference corresponds to the distance traveled between two characteristic points.

For example, in FIG. 5, the magnitude of the point (66) on profile (62) correspond to the magnitude of the profile (60) where the RFID tag traveled a distance $d_1$ from a position (e.g., 31A) corresponding to the previous null point (68A). Thus, the position of the RFID tag at the point (66) on profile (62) is approximately a distance $d_1$ away from the position corresponding to the null point (68B). Similarly, the magnitude of the point (64) on profile (62) correspond to the magnitude of the profile (60) where the RFID tag traveled a distance $d_2$ from a position (e.g., 31A) corresponding to the previous null point (68A). Thus, the position of the RFID tag at the point (64) on profile (62) is a distance $d_2$ away from the position corresponding to the null point (68B). Thus, the profile (60) is used as a mapping function to map the magnitude of the profile signal into distance.

In one embodiment, the magnitude of the profile (62) is sampled periodically to determine the distance the RFID tag has traveled from the point corresponding to the previous null point. Thus, speed and position parameters of the RFID tag can be determined with improved resolution (in time and/or space). For example, the RFID reader does not have to wait until the RFID tag moves over a distance of $\lambda/2$ or more to determine the average speed of the RFID tag over the distance.

The velocity measured by Doppler beat frequency can be sampled and averaged or integrated over time to produce an average velocity with or without respect to static nulls.

Figure 6:
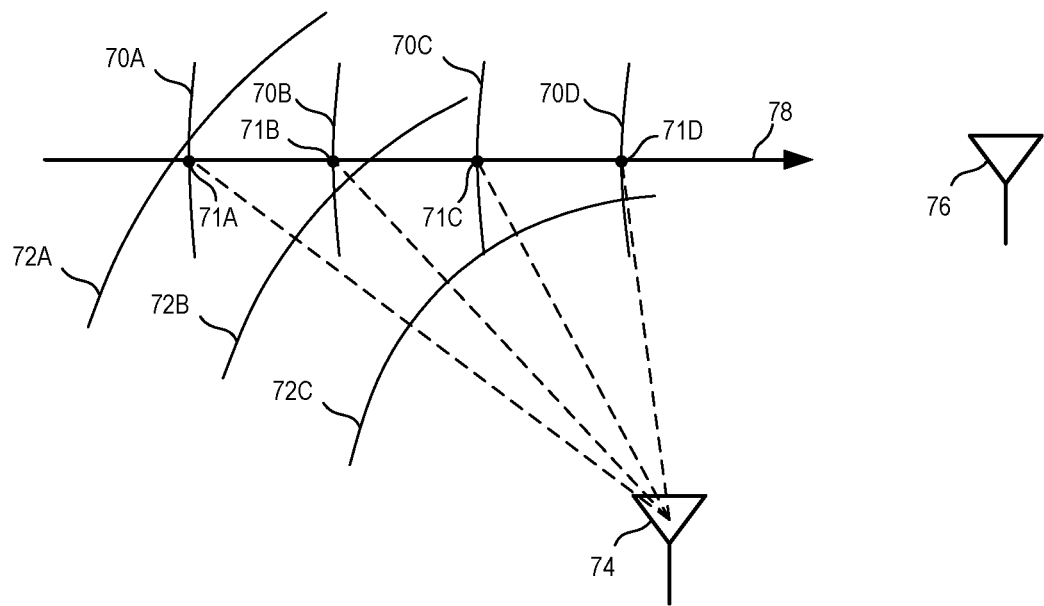
FIG. 6 shows a method to resolve ambiguity according to one embodiment.

FIG. 6 shows a method to resolve ambiguity according to one embodiment. In FIG. 6, two antennas (76 and 74) are used to determine different phase shifts for the interrogating electromagnetic wave traveling along different paths. For example, the antenna (76) is used to transmit an interrogating electromagnetic wave; and the backscattered interrogating electromagnetic wave is received at the antenna (76) and the antenna (74).

In FIG. 6, arcs (70A, 70B, 70C, 70D) represent the positions where an RFID tag can backscatter the interrogating electromagnetic wave to the antenna (76) to generate null points in the profile signal created via the antenna (76). Arcs (72A, 72B, 72C) represent the positions where an RFID tag can backscatter the interrogating electromagnetic wave to the antenna (74) to generate null points in the profile signal created via the antenna (76). If the tag is known to be moving along the path (78), the candidates (71A, 71B, 71C, 71D) for the position of the RFID tag are the intersection points of the arcs (70A, 70B, 70C, 70D) with the path (78), when the profile signal created via the antenna (76) reaches a null point. However, these candidates (71A, 71B, 71C, 71D) generally have different phases in the profile signal created via the antenna (74). Thus, the magnitude of the profile signal created via the antenna (74) can be used to identify which of the candidates is the position of the RFID tag.

For example, the magnitude of the profile signal created via the antenna (74) while the RFID tag is at the candidates (71A, 71B, 71C, 71D) can be determined and sorted. The magnitudes of the candidates (71A, 71B, 71C, 71D) are compared to the current magnitude of the profile signal created via the antenna (74). The closest candidate can be identified as the position of the RFID tag.

Further, in one embodiment, the received signal strength (sometimes called RSSI), measured by the RFID tag or by the reader, can be used to limit the ambiguity or resolve certain ambiguity. In one embodiment, the signal strength and/or the magnitude of the profile phases for different candidates can be pre-mapped to generate a look up table, or a mapping function to speed the process of resolving ambiguity.

Although FIG. 6 illustrates an example of resolving ambiguity for null points, the procedure can also be used to resolve ambiguity other characteristic points, such as maximum points, or intermediate points measured relative to the characteristic points (e.g., via the method illustrated in FIG. 5).

In one embodiment, more than two antennas can be used to resolve ambiguity. For example, when two antennas are not sufficient to resolve ambiguity (with or without the use of received signal strength indicator), a third antenna can be used to resolve the ambiguity. The antennas can be positioned to increase the ability and accuracy in resolve ambiguity.

Further, in one embodiment, multiple antennas are used to determine the RFID tag without known the path or plane of the RFID tag. For example, when two antennas are used to obtain two profile signals, the position of the RFID tag can be determined to be at a set of candidate points on a plane (e.g., the intersection points of the arcs (70A, 70B, 70C, 70D) and arcs (72A, 72B, 72C) when both profile signals are at null points). A third antenna and/or received signal strength indicator (RSSI) can be used to resolve ambiguity. Thus, the reader can determine the RFID tag without knowing a predetermined traveling path of the RFID tag.

In some embodiments, the reader determines the direction of the tag relative to the reader antenna, based the signal backscattered from the tag. The measured direction can be used to determine the position and/or resolve ambiguity.

The methods of the disclosure can further be extended to measure the position and velocity of the tag in a three dimensional space.

Figure 7:
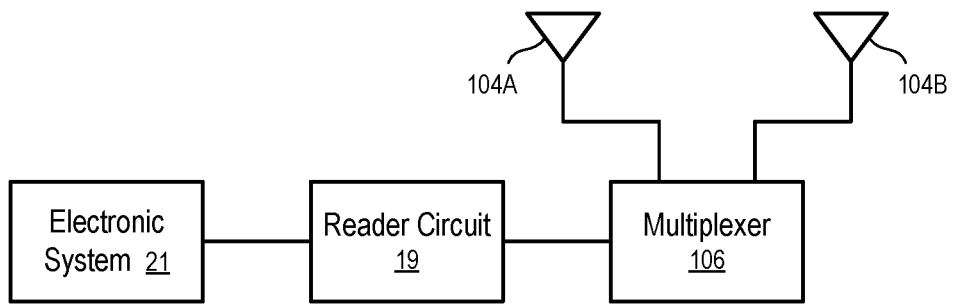
FIG. 7 shows an RFID reader with multiple antennas.

FIG. 7 shows an RFID reader with multiple antennas. In FIG. 7, the reader circuit (19) is connected to multiple antennas (104A and 104B) via a multiplexer (106). The multiplexer (106) connects the reader circuit (19) to the antennas (104A and 104B) one at a time, to allow the reader to interrogate the tags from different locations and thus to monitor the tag relative to the different antenna locations. The measurements obtained from different antenna locations can be used to improve measurement accuracy and/or to determine the position of the tag.

Because a limiting factor that determines the range between a reader and passive tag is the power needed to power the tag, and the range of reflected information is much longer, the interrogator transmitter and receiver(s) may be located at different locations. The received carrier reflected by the tag to different receivers can be used to further improve accuracy and remove ambiguities. For example, one reader may read reflected tag signals from another reader.

Figure 8:
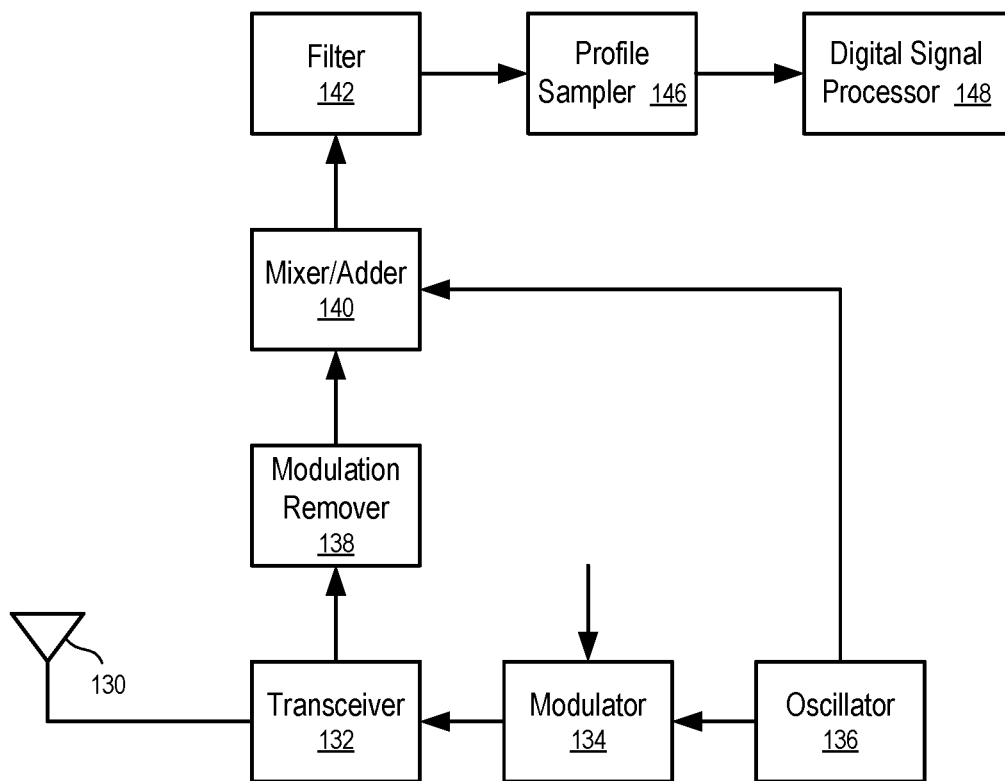
FIG. 8 shows a block diagram of an RFID reader to combine signals in analog form according to one embodiment.

FIG. 8 shows a block diagram of an RFID reader to combine signals in analog form according to one embodiment. In FIG. 8, the reader includes an oscillator (136) to generate a carrier signal for the interrogation of the tags. The modulator (134) coupled to the oscillator to modulate the carrier signal according to the commands to be sent to the tags. The transceiver (132) is coupled to the reader antenna (130) to transmit the carrier signal with or without modulation.

In one embodiment, after the reader transmits the commands, the reader controls the modulator to transmit the carrier signal without modulation. The RFID tags are allowed to modulate the backscattered carrier signal to provide responses.

The transceiver (132) receives the backscattered carrier signal via the antenna (130) (or a different antenna not shown in FIG. 8). The signals modulated on the backscattered carrier signal can be used to determine the identity of the tag (e.g., using a circuitry not shown in FIG. 8). The modulation remover (138) removes amplitude modulation on the backscattered carrier signal and thus normalizes the backscattered carrier signal. The mixer or adder (140) is used to generate an analog signal that is representative of the phase/frequency difference between the backscattered carrier signal and the carrier signal generated by the oscillator (136).

In FIG. 8, the filter (142) removes the carrier signal from the output of the mixer or adder (140) to generate a profile signal, which is sampled by the profile sampler (146) periodically. The digital signal processor (148) determines the position and/or the speed of the tag based on the sampled profile data generated by the profiler sampler (146).

In one embodiment, to determine the position or speed of a tag, the reader provides a command to the selected tag to cause the tag in a high reflective state without modulating the backscattered carrier signal (and other RFID tags in the field are placed in an absorbing mode). The modulation remover (138) is thus reduced to a signal normalizer.

Figure 9:
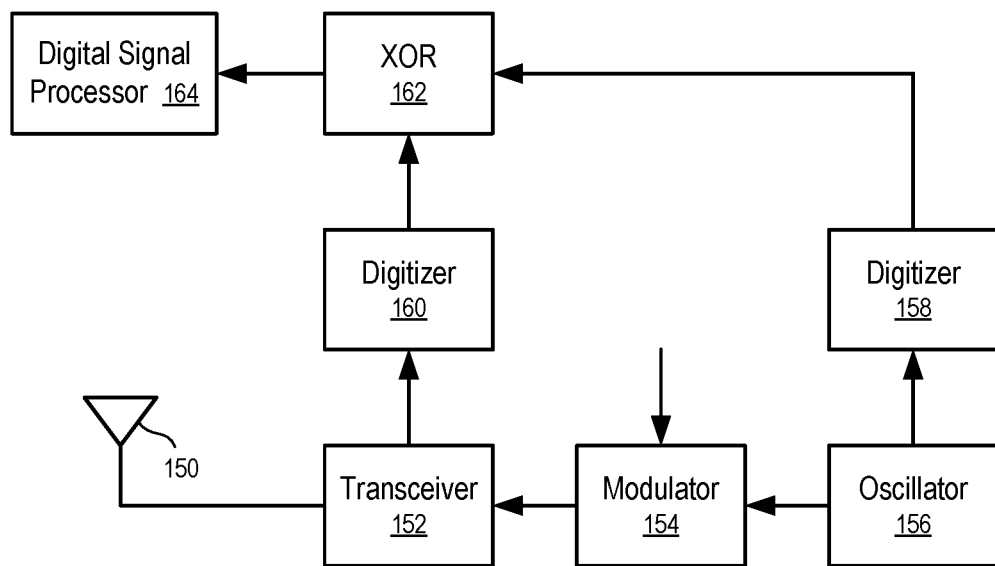
FIG. 9 shows a block diagram of an RFID reader to combine signals in digital form according to one embodiment.

FIG. 9 shows a block diagram of an RFID reader to combine signals in digital form according to one embodiment. In FIG. 9, the reader includes an oscillator (156) to generate a carrier signal for the interrogation of the tags. The modulator (154) coupled to the oscillator to modulate the carrier signal according to the commands to be sent to the tags. The transceiver (152) is coupled to the reader antenna (150) to transmit the carrier signal with or without modulation.

The transceiver (152) receives the backscattered carrier signal via the antenna (150) (or a different antenna not shown in FIG. 9). The signals modulated on the backscattered carrier signal can be used to determine the identity of the tag (e.g., using a circuitry not shown in FIG. 9). The digitizers (158 and 160) convert the analog carrier signals to digital signals. The logic XOR unit (162) performs exclusive OR on the digitized signals. The digital signal processor (164) detects the transitions in the output of the logic XOR unit (162) to determine the frequency difference between the backscattered carrier signal and the carrier signal generated by the oscillator (156) and to determine the speed of the tag.

In some embodiments, the speed of an active tag can also be determined through detecting the frequency shift in the carrier signals transmitted by the active tag. For example, the active tag can be calibrated to have the same carrier frequency as the reader (or other frequencies with a known relation relative to the frequency of the oscillator of the reader). Thus, the frequency shift due to relative motion between the active tag and the reader antenna can be determined from combining the received carrier signal of the active tag and the frequency of the oscillator of the reader.

In some of the embodiments, an RFID tag responds to the interrogating electromagnetic wave with a tag identification value, or data held in the tag memory. In these embodiments, determining the kinematical parameters for relative motion between the RFID tag and the reading antenna is based on periods of time during which the RFID tag is reflective. However, in some situations the periods of time when the RFID tag is reflective as part of communicating data may be insufficient to determine the frequency shift (e.g., the data rate is too high and the reflective period is therefore too short). Thus, in other embodiments, an RFID tag is placed into a reflective mode such that, for an extended period of time relative to selective backscattering to send data, the RFID tag is in a purely reflective mode. The reader circuit and/or electronic system in these embodiments are configured to send a command instructing the RFID tag to change its operation to a constant or alternating repetitive state; hence, the electromagnetic waves received at the reading antenna are only backscattered electromagnetic wave without any associated data. The RFID tag is configured to time out of the reflective state, or the command sent to the place the tag in the reflective state, may include a period of time for the RFID tag to stay reflective, and then revert to prior operational modes. Thus, by setting the RFID tag to a reflective state determining of the speed of the tag relative to the reader system can occur for a longer period of time, or occur more rapidly.

Figure 10:
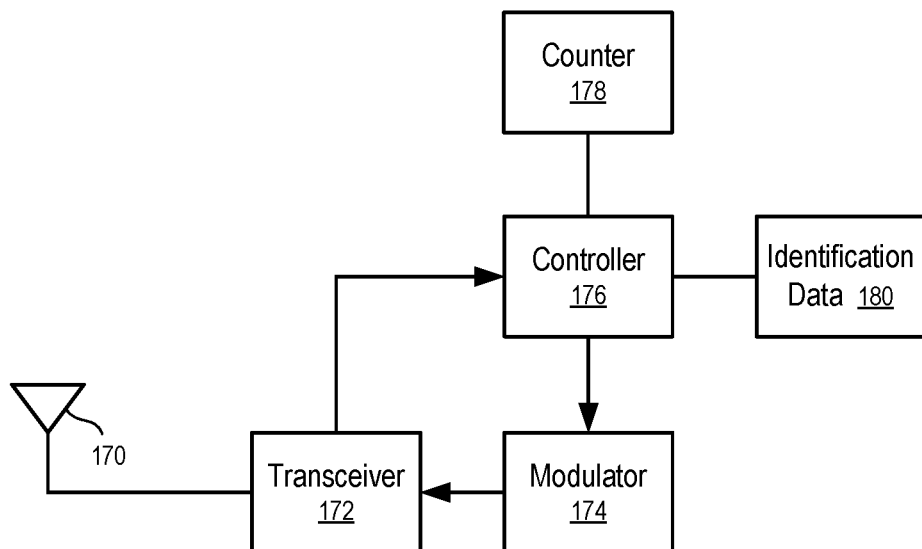
FIG. 10 shows a block diagram of an RFID tag according to one embodiment.

FIG. 10 shows a block diagram of an RFID tag according to one embodiment. In FIG. 10, the tag includes a tag antenna (170), a transceiver (172), a modulator (174), a memory for tag identification data (180), a controller (176) and a counter (178). When the transceiver (172) receives a command to read the identification data (180), the controller (176) can modulate the carrier signal by switching the tag between a high backscattering mode and a low backscattering mode. When the controller (176) receives a command to measure the speed of the tag, the controller (176) causes the modulator (174) to set the tag in the high backscattering mode for a period of time. The counter (178) is used to determine the expiration of the high back scattering mode.

In one embodiment, the command includes a specification of the duration of the time period for the measurement of the speed of the tag. The controller (176) sets the counter (178) according to the time duration specified in the command received from the reader.

Alternatively, the RFID tag may not include a counter (178). When the tag is placed in the high backscattering mode for speed measurement, the controller (176) monitors the interrogating electromagnetic wave to detect a subsequent command. When the reader transmits a subsequent command, or when the interrogating electromagnetic wave is temporarily interrupted, the controller (176) switches off the high backscattering mode.

In another embodiment, the tag is an active tag that has its own oscillator (not show in FIG. 10). When the tag receives a command for the speed measurement, the tag is switched to transmit the carrier signal without modulation, for a predetermined period of time, or upon receiving a subsequent command from the reader. The signal transmitted by the active tag is received at different antennas to generate combined signals to indicate the phase difference(s) due to different signal paths. The position of the active tag can then be determine with certain ambiguity, which can be resolved via the use of multiple antennas and/or the received signal strength indicator (RSSI).

Figure 11:
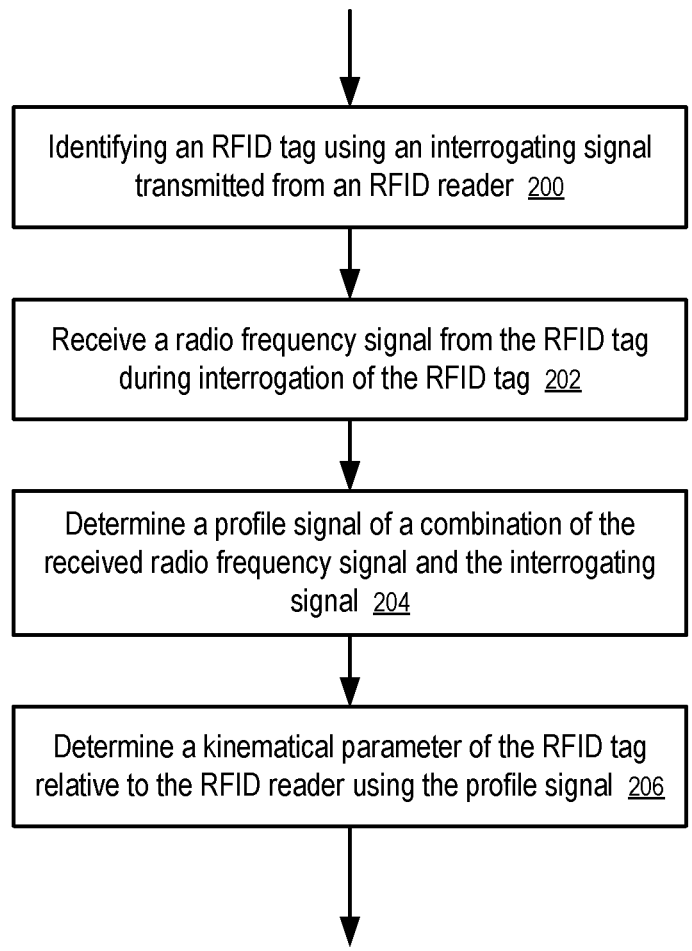
FIG. 11 shows a method implemented in an RFID system according to one embodiment.

FIG. 11 shows a method implemented in an RFID system according to one embodiment. In FIG. 11, an RFID reader identifies (200) an RFID tag using an interrogating electromagnetic wave generated from an interrogating signal transmitted from the RFID reader. The RFID reader receives (202) a radio frequency signal from the RFID tag during interrogation of the RFID tag. A profile signal of a combination of the received radio frequency signal and the interrogating signal is determined (204) and used to determine (206) a kinematical parameter of the RFID tag relative to the RFID reader.

In one embodiment, to determine the kinematical parameter of the RFID tag, the reader circuit determines a position of the RFID tag based on magnitude of the profile signal. For example, at least one from a plurality of candidates of the position can be selected based on the magnitude of the profile signal and/or a received signal strength indicator.

In one embodiment, to determine the kinematical parameter of the RFID tag, the reader circuit determines a speed of the RFID tag based on sampling the profile signal at two more time instances within a cycle of the profile signal. For example, a distance traveled by the RFID tag between the two time instances can be calculated based on the profile signal sampled at the two time instances; and the average speed of the RFID tag between the two time instances can then be computed from the calculated distance. In one embodiment, the distance is calculated based on the wavelength of the interrogation signal as observed by a stationary object. The static wavelength error due to the different wavelength of a moving tag can be used to determine more accurately the actual static wavelength null spacing. The error increases with velocity, and may be selectively ignored if the error falls beneath a threshold value.

In one embodiment, the RFID reader receives a first radio frequency signal via a first antenna and a second radio frequency signal from the RFID tag via a second antenna. The kinematical parameter, such as a distance or speed, is determined based on both the profile signal of the combination of the interrogating signal with the first radio frequency signal, received via the first antenna, and the profile signal of the combination of the interrogating signal with the second radio frequency signal, received via the second antenna.

In one embodiment, the antenna maintains transmission of the interrogating electromagnetic wave for a period of time, while the RFID tag operates in a mode of increased backscatter of the interrogating electromagnetic wave. The RFID reader receives the radio frequency signal according to the interrogating electromagnetic wave backscattered from the RFID tag. The RFID reader instructing a plurality of RFID tags other than the RFID tag to be in a mode to absorb the interrogating electromagnetic wave to reduce noise.

In one embodiment, to generate the profile signal, the reader circuit combines the received radio frequency signal and the interrogating signal to generate a combined signal; and a low pass filter is applied on the combined signal to generate the profile signal. The received radio frequency signal and the interrogating signal may be summed or mixed to generate the combined signal.

In one embodiment, a plurality of characteristic points of the profile signal, such as minimum, maximum, null, inflection, are determined together with a time period of the plurality of characteristic points determined to compute the speed of the RFID tag.

In one embodiment, to determine the time period, the profile signal is sampled at a predetermined time interval to count characteristic points during one or more time periods of the predetermined time interval. A time period outside the plurality of characteristic points is determined and deducted from the one or more time periods of the predetermine time interval. For example, a plurality of sample points of the profile signal can be interpolated to compute the time period outside the plurality of characteristic points.

In one embodiment, a beginning point and an ending point of the detected characteristic points are two different ones of: minimum, maximum, null and inflection.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A reader, comprising:
    an antenna circuitry to transmit an interrogating electromagnetic wave according to an interrogating signal having a predetermined frequency;
    a receiver circuitry to obtain a received signal generated by a radio frequency device from the interrogating electromagnetic wave, the radio frequency device having an identification; and
    a processor coupled to the receiver to:
        determine the identification of the radio frequency device from the received signal;
        combine a portion of the interrogating signal having the predetermined frequency with a portion of the received signal to generate a combined signal; and
        compute a position or speed of the radio frequency device based at least in part on a characteristic parameter of the combined signal.

2. The reader of claim 1, wherein the processor is configured to measure the characteristic parameter of the combined signal from a profile of the combined signal.

3. The reader of claim 2, wherein the received signal is a backscattered version of the interrogating electromagnetic wave from backscattering.

4. The reader of claim 2, wherein the processor is configured to generate the combined signal by summing the portion of the interrogating signal having the predetermined frequency with the portion of the received signal.

5. The reader of claim 2, wherein the processor is configured to generate the combined signal by mixing the portion of the interrogating signal having the predetermined frequency with the portion of the received signal.

6. The reader of claim 2, wherein the processor comprises a digital processing unit configured to:
   count a number of characteristic points in the profile of the combined signal; and
   determine a time duration between a beginning one of the characteristic points and an ending one of the characteristic points;
   wherein the characteristic parameter, based on which the position or speed of the radio frequency device is computed, is based on the time duration of the number of characteristic points.

7. The reader of claim 6, wherein the beginning one and the ending one of the characteristic points are two different ones of: minimum, maximum, null and inflection, in the profile of the combined signal.

8. The reader of claim 6, wherein the processor further comprises:
   a low pass filter to generate the profile signal; and
   a signal sampler to sample the profile signal.

9. The reader of claim 8, further comprising:
   a normalizer to normalize the received signal for combination with portion of the interrogating signal having the predetermined frequency.

10. A system, comprising:
    at least one radio frequency device, the radio frequency device having an identification; and
    a reader having:
       an antenna circuitry to transmit an interrogating electromagnetic wave according to an interrogating signal having a predetermined frequency;
       a receiver circuitry to obtain a received signal generated by the radio frequency device from the interrogating electromagnetic wave; and
       a processor coupled to the receiver to:
          determine the identification of the radio frequency device from the received signal;
          combine a portion of the interrogating signal having the predetermined frequency with a portion of the received signal to generate a combined signal; and
          compute a position or speed of the radio frequency device based at least in part on a characteristic parameter of the combined signal.

11. The system of claim 10, further configured to measure the characteristic parameter of the combined signal from a profile of the combined signal.

12. The system of claim 11, wherein the received signal includes a backscattered version of the interrogating electromagnetic wave.

13. The system of claim 11, further configured to generate the combined signal by summing or mixing the portion of the interrogating signal having the predetermined frequency with the portion of the received signal.

14. The system of claim 11, further comprising:
    a digital processing unit configured to:
       count a number of characteristic points in the profile of the combined signal, the characteristic points being at least one of: minimum, maximum, null and inflection, in the profile of the combined signal; and
       determine a time duration between a beginning one of the characteristic points and an ending one of the characteristic points;
    wherein the characteristic parameter, based on which the position or speed of the radio frequency device is computed, is based on the time duration of the number of characteristic points.

15. The system of claim 14, further comprising:
    a normalizer to normalize the received signal for combination with portion of the interrogating signal having the predetermined frequency;
    a low pass filter to generate the profile signal; and
    a signal sampler to sample the profile signal.

16. A method, comprising:
    transmitting an interrogating electromagnetic wave according to an interrogating signal having a predetermined frequency;
    receiving a received signal generated by a radio frequency device from the interrogating electromagnetic wave, the radio frequency device having an identification;
    determining the identification of the radio frequency device from the received signal;
    combining a portion of the interrogating signal having the predetermined frequency with a portion of the received signal to generate a combined signal; and
    computing a position or speed of the radio frequency device based at least in part on a characteristic parameter of the combined signal.

17. The method of claim 16, further comprising:
    measuring the characteristic parameter of the combined signal from a profile of the combined signal.

18. The method of claim 17, wherein the received signal includes a backscattered version of the interrogating electromagnetic wave.

19. The method of claim 17, wherein the combining to generate the combined signal includes summing the portion of the interrogating signal having the predetermined frequency with the portion of the received signal.

20. The method of claim 17, wherein the combining to generate the combined signal includes mixing the portion of the interrogating signal having the predetermined frequency with the portion of the received signal.

* * * * *